United States Patent [19]

Parkinson

[11] Patent Number: 5,190,987
[45] Date of Patent: Mar. 2, 1993

[54] METHOD FOR DRYING FOAMS

[76] Inventor: Martin Parkinson, 6 North Delaware Dr., Nyack, N.Y. 10960

[21] Appl. No.: 927,852

[22] Filed: Aug. 10, 1992

[51] Int. Cl.⁵ .............................. C08J 9/40; C08J 9/42
[52] U.S. Cl. .................................... 521/146; 521/181; 521/918
[58] Field of Search ......................... 521/146, 181, 918

[56] References Cited
U.S. PATENT DOCUMENTS
4,735,794  4/1988  Parkinson ................................ 424/3

OTHER PUBLICATIONS

J. D. LeMay et al., pp. 19–45, 15 (No. 12) (1990), Mater. Res. Soc. Bul.
"R. W. Pekala et al." Thermal Conductivity of Monolithic Organic Aerogels, pp. 971–972 Feb. 21, 1992 Science.
"R. W. Pekala" pp. 3221–3225, 24, 1989, J. Mater. Sci.

*Primary Examiner*—Morton Foelak
*Attorney, Agent, or Firm*—Martin Parkinson

[57] ABSTRACT

A method for drying foams, and in particular inorganic and organic aerogels, so that intricate internal pore/cell structure is maintained utilizing a select group of fluorocarbon solvents. Replacement of precursor diluents with a fluorocarbon solvent, followed by direct sublimation, is employed to dry the foam in place of critical point drying.

8 Claims, No Drawings

METHOD FOR DRYING FOAMS

BACKGROUND OF THE INVENTION

This invention relates to the drying of foams in a manner to preserve internal cellular foam structure, and in particular to the drying of aerogels.

Materials consisting substantially of an air filled cellular network such as foam rubber, and "blown" plastic foams such as polyurethane and polystyrene, are common, everyday products. They are employed in great quantities for cushions in furniture, insulation for home refrigerators, etc. In recent years a new group of open-cell foams have been devised called "aerogels". Aerogels are derived from highly cross-linked inorganic or organic gels. Aerogels are characterized by an ultra-fine cell/pore size of approximately 1 to 10 nm. across, continuous porosity, with a microstructure composed of polymeric chains or colloidal like particles interconnected together.

This microstructure endows aerogels with unique properties including extremely low thermal conductivity, making them of interest for purposes of thermal insulation. For example, aerogels made from silica can be used for transparent window insulation. And low cost organic aerogels are of interest as a replacement for traditional fluorocarbon blown urethane foams used for refrigeration insulation, and the like.

In the manufacture of aerogels, typically a final stage is reached in which a diluent filled gel must be dried. Evaporative drying to remove this liquid diluent usually causes the delicate pore structure to collapse due to large capillary forces during the drying process. Similarly freeze drying will often damage the gel microstructure due to large solvent crystals at the freezing front. In order to preserve the gossamer structure of inorganic and particularly organic aerogels, critical point drying has been found the method of choice. In this drying technology the liquid diluent is usually replaced with a solvent such as alcohol or acetone, and this solvent is then replaced with a transitional fluid such as liquid carbon dioxide. The liquid carbon dioxide saturated gel is now placed in a pressure vessel, and the vessel is heated to bring the liquid carbon dioxide to its critical temperature and pressure. The now gaseous transitional fluid may now be bled off without surface tension distortion of the microporous structure of the aerogel.

In U.S. Pat. No. 4,735,794 I disclose a simpler method in comparison to the normally employed critical point specimen drying for preparing specimens for the scanning electron microscope. It is believed this method will yield similar benefits for optimum three-dimensional structural maintenance for porous foam drying in general, and in particular in maintaining microporous structure within inorganic and organic aerogels.

Accordingly it is an object to provide a simple method for preserving porous structure during the drying of foams.

Another object is to provide a method for maintaining microporous pore structure during the drying of aerogels.

A further object is to provide a method for preserving microporous structure in organic aerogels.

Still another object is to provide for large scale drying of aerogels in a practical manner.

SUMMARY OF THE INVENTION

These and related objects can be obtained with the instant invention in which a select group of fluorocarbon solvents are employed to prevent surface tension distortion of intricate microporous structure during the drying of porous foam materials. And in the case of inorganic and organic aerogels wherein critical point drying is mandated by the labile nature of the micro pore/cell configuration the instant invention offers substantial advantages in simplicity and economy in gel drying procedures.

A full discussion of low-density microcellular materials, including inorganic and organic aerogels, is given in "Material Research Society Bulletin, 15 (no. 12), 19 (1990), by J.D. Lemay, R. W. Hopper, L. W. Hrubesh, R. W. Pekal", the disclosure of which is hereby incorporated by reference. In addition a method for preparing organic aerogels made from resorcinol-formaldehyde is given in "Journal of Material Science, 24, 3221 (1989), by R. W. Pekala", the disclosure of which is hereby incorporated by reference. Inorganic aerogels can be made in a variety of ways, a typical procedure being the sol-gel polymerization of tetramethoxy silane or tetraethoxy silane. Similary organic aerogels can be made by polycondensation of resorcinol with formaldehyde and melamine with formaldehyde, both reactions being in aqueous media. A variety of other organic materials can yield aerogel or aerogel like structures, including carboxymethyl cellulose, polystyrene/divinylbenzene, and cellulose acetate. Still another fabrication technique involves pyrolyzing the organic aerogels in order to make a carbon replica of the aerogel.

In the method for preparing organic aerogels from resorcinol-formaldehyde by R. W. Pekala cited above a typical gel formulation contained 0.29M resorcinol, 0.57M formaldehyde and 1.5–4.0 mM sodium carbonate for a total of 5.0% solids. After gel formation the gel was further treated to an acid wash of 0.125% trifluoroacetic acid at 45 degrees C. Finally the aqueous diluent was replaced by placing the gel in 4 liters of fresh, heated acetone on a daily basis for 4 days. The acetone filled gel was then placed in a pressure vessel, the vessel was then bled of air while it was filled with liquid carbon dioxide at 900 PSI and at a vessel temperature of 14 degrees C. This liquid carbon dioxide flushing procedure was repeated until all or virtually all of the acetone had been replaced by liquid carbon dioxide, whereupon the liquid carbon dioxide was heated to its critical temperature. The now gaseous carbon dioxide was then vented from the vessel while being maintained at this critical temperature.

In U.S. Pat. No. 4,735,794 I disclosed a simpler method, in comparison to critical point drying, for preserving specimen morphology during specimen drying prior to examining specimens under the scanning electron microscope. This method makes use of two fluorocarbon solvents. They are 1,1-difluorotetrachloroethane, and 1,2-difluorotetrachloroethane. Both are solid at room temperature, and have a boiling point of approximately 93 degrees C. Both melt conveniently just above room temperature, so that specimens are subjected to extremely mild temperature conditions within a virtually inert transitional fluid. After replacement of the original diluent (usually water) with either acetone or alcohol (or any suitable solvent in which these fluorocarbon solvents are soluble), the solvent saturated specimen is then placed in a mixture of one of the fluorocarbon solvents dissolved in the specimen solvent, or directly into one of the two fluorocarbon solvents (liquified by heating), with sufficient exchanges being made with fresh, liquid fluorocarbon solvent so as to insure virtual complete replacement of the original specimen solvent with the fluorocarbon solvent. The fluorocarbon solvent is then chilled to solidify it, or it is simply permitted to solidify at room temperature. The fluorocarbon solvent embedded specimen is then subjected to a vacuum, whereupon the solvent readily sublimates away from the specimen.

A typical aerogel drying procedure according to the instant invention is:

Resorcinol-Formaldehyde Gel prepared according to the procedure described above (1) Replace aqueous diluent in gel by repeatedly washing the gel in fresh batches of acetone.

(2) Replace the acetone in gel by repeatedly washing the gel in 1,1-difluorotetrachloroethane maintained at 60 degrees C.

(3) Solidify the 1,1-difluorotetrachloroethane by either chilling it with refrigeration, or allowing it to solidify at room temperature.

(4) Sublimate the 1,1-difluorotetrachloroethane from the resorcinol-formaldehyde gel by placing the gel in a vacuum impervious chamber, and then continuously evacuating the chamber with a mechanical forepump, or by pumping the chamber overnight on house vacuum.

Following these steps should result in the preservation of internal structure of liquid filled foams during drying, and in particular to the preservation of the intricate microporous structure during the drying of inorganic and organic aerogels.

While the present invention has been disclosed in detail, various modifications and improvements will occur to those skilled in the art. Accordingly the spirit and scope of the present invention is to be limited only by the following claims.

I claim:

1. A method for maintaining the internal structure of a liquid filled organic polymer foam during the removal of said liquid from said foam, which comprises the steps of:
   (a) replacing said liquid within said foam by immersing said foam in a melted fluorocarbon solvent selected from the group consisting of
   1,1-difluorotetrachloroethane and
   1,2-difluorotetrachloroethane;
   (b) solidifying said melted fluorocarbon solvent; and
   (c) vacuum sublimating said solidified fluorocarbon solvent from said foam.

2. A method according to claim 1 wherein said foam is an aerogel.

3. A method according to claim 1 further comprising the step of replacing said liquid with an intermediate solvent prior to the step of immersing said foam in said fluorocarbon solvent, said fluorocarbon solvent being soluble in said intermediate solvent.

4. A method according to claim 1 further comprising the step of allowing said melted fluorocarbon solvent to solidify at room temperature.

5. A method according to claim 1 in which said fluorocarbon solvent is 1,1-difluorotetrachloroethane.

6. A method according to claim 1 in which said solvent is 1,2-difluorotetrachloroethane.

7. A method according to claim 3 in which said intermediate solvent is alcohol.

8. A method according to claim 3 in which said intermediate solvent is acetone.

* * * * *